US007899459B2

(12) United States Patent
Ishii et al.

(10) Patent No.: US 7,899,459 B2
(45) Date of Patent: Mar. 1, 2011

(54) CALL ADMISSION CONTROL DEVICE AND CALL ADMISSION CONTROL METHOD

(75) Inventors: Hiroyuki Ishii, Yokosuka (JP); Akihito Hanaki, Yokohama (JP)

(73) Assignee: NTT DoCoMo, Inc., Chiyoda-ku (JP)

( * ) Notice: Subject to any disclaimer, the term of this patent is extended or adjusted under 35 U.S.C. 154(b) by 500 days.

(21) Appl. No.: 11/634,232

(22) Filed: Dec. 6, 2006

(65) Prior Publication Data

US 2007/0135133 A1    Jun. 14, 2007

(30) Foreign Application Priority Data

Dec. 8, 2005  (JP) .................................. 2005-355290

(51) Int. Cl.
*H04W 72/00* (2009.01)
(52) U.S. Cl. .................... 455/450; 455/452.1; 455/452.2; 455/453; 455/509; 370/395.2; 370/395.21; 370/395.41
(58) Field of Classification Search ................... 455/560, 455/450–453, 509; 370/395, 395.2, 395.21, 370/395.41, 395.42, 395.43, 437, 444
See application file for complete search history.

(56) References Cited

U.S. PATENT DOCUMENTS

| 5,740,537 | A  | * | 4/1998  | Beming et al. ............... 455/450 |
| 6,650,643 | B1 | * | 11/2003 | Dobson ....................... 370/395.1 |
| 7,120,446 | B2 |   | 10/2006 | Iwamura et al. |
| 2002/0102986 | A1 | * | 8/2002 | Iwamura et al. ............... 455/453 |
| 2003/0064730 | A1 | * | 4/2003 | Chen et al. .................... 455/453 |
| 2003/0210660 | A1 |   | 11/2003 | Wiberg et al. |
| 2004/0082363 | A1 | * | 4/2004 | Hosein ........................ 455/560 |

(Continued)

FOREIGN PATENT DOCUMENTS

EP    0 915 592 A1    5/1999

(Continued)

OTHER PUBLICATIONS

M. Kazmi, et al., "Admission Control Strategy and Scheduling Algorithms for Downlink Packet Transmission in WCDMA," Vehicular Technology Conference, IEEE, VTS Fall VTC, $52^{nd}$, Sep. 24-28, 2000, pp. 674-680, vol. 2, Piscataway, NJ.

(Continued)

*Primary Examiner* — Jinsong Hu
*Assistant Examiner* — Dung Hong
(74) *Attorney, Agent, or Firm* — Crowell & Moring LLP

(57) ABSTRACT

In a communication system which transmits a packet to a plurality of mobile stations classified into a plurality of priority classes, call admission control is realized with a priority class taken into account. When a new mobile station is starting communications, the number of mobile stations which belong to a plurality of priority classes is calculated by a mobile station number acquisition unit. A weight coefficient setting unit sets a weight coefficient for each of the plurality of priority classes. A first threshold value setting unit and a second threshold value setting unit set a threshold value for each of the plurality of priority classes. A first call number judgment unit and a second call number judgment unit control admission of a call by a new mobile station based on the number of mobile stations belonging to the plurality of priority classes, the weight coefficient for each of the plurality of priority classes, and the threshold value of each of the plurality of priority classes. Based on the set threshold value and the weight coefficient, the call admission control can be realized with the priority class taken into account.

3 Claims, 6 Drawing Sheets

U.S. PATENT DOCUMENTS

2004/0213153 A1* 10/2004 Nagato et al. .................. 370/230
2005/0043034 A1* 2/2005 Abdel-Ghaffar et al. ..... 455/453

FOREIGN PATENT DOCUMENTS

| EP | 1 227 695 A1 | 7/2002 |
| EP | 1 471 764 A2 | 10/2004 |
| JP | 2002-223239 A | 8/2002 |
| JP | 2004-328157 A | 11/2004 |
| JP | 2005-525743 A | 8/2005 |
| WO | WO 03/088702 A1 | 10/2003 |
| WO | WO 2004/039006 A2 | 5/2004 |

OTHER PUBLICATIONS

European Search Report dated Apr. 13, 2007 (ten (10) pages).
1. "cdma2000 High Rate Packet Data Air Interface Specification", 3rd Generation Partnership Project 2 "3GPP2", 3GPP2 C.S0024-A, Version 1.0, Mar. 2004, pp. i to 16-13.
3GPP TR 25.848, "$3^{rd}$ Generation Partnership Project; Technical Specification Group Radio Access Network; Physical layer aspects of UTRA High Speed Downlink Packet Access (Release 4)", V4.0.0. (Mar. 2001) (1-89 pages).

* cited by examiner

| | WEIGHT COEFFICIENT | SECOND THRESHOLD VALUE |
|---|---|---|
| FIRST PRIORITY CLASS | 10 | 100 |
| SECOND PRIORITY CLASS | 5 | 300 |
| THIRD PRIORITY CLASS | 0 | 1000 |

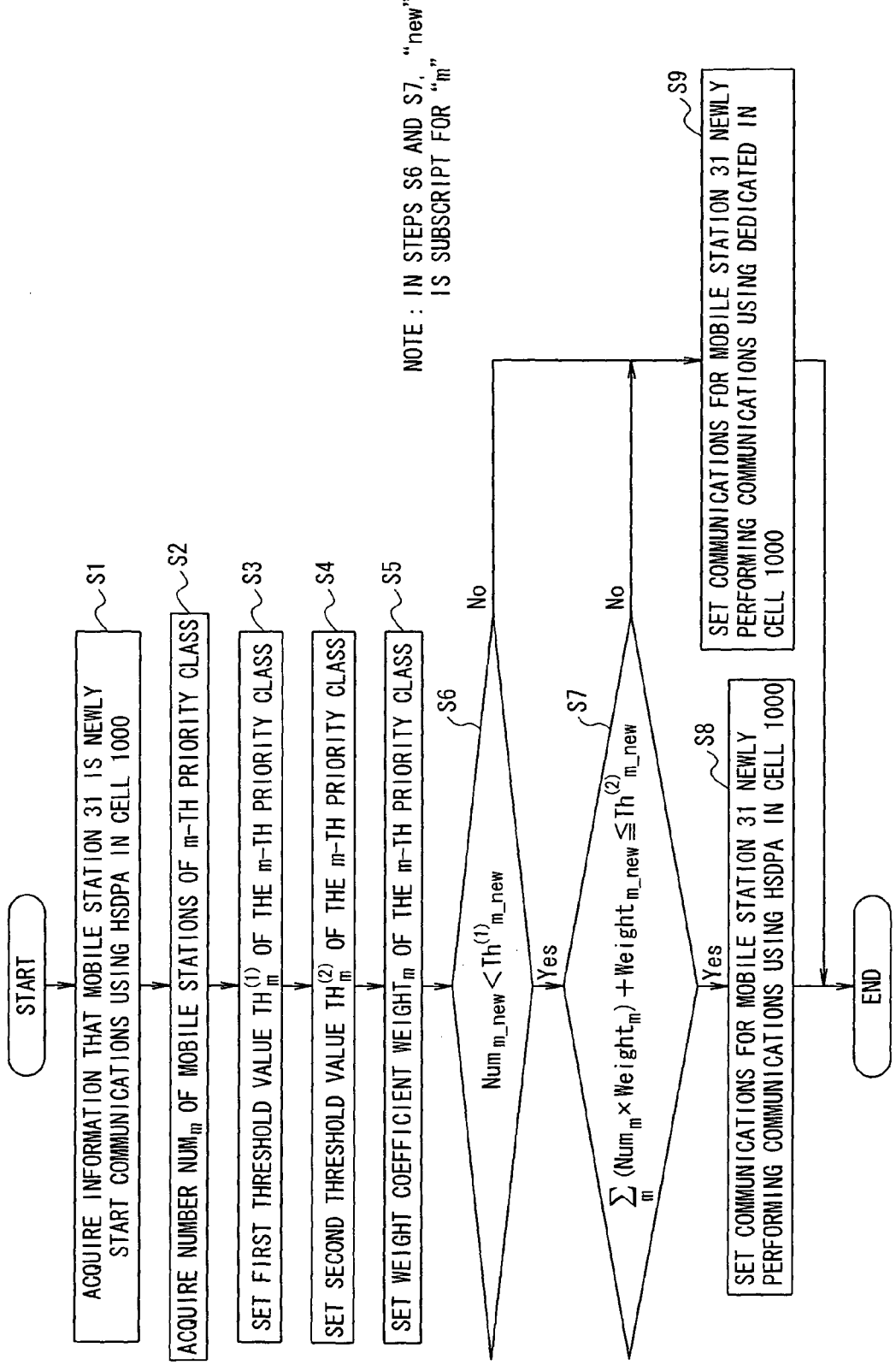

CALL ADMISSION CONTROL DEVICE AND CALL ADMISSION CONTROL METHOD

BACKGROUND OF THE INVENTION

1. Field of the Invention

The present invention relates to a call admission control device and a call admission control method, and more specifically to a call admission control device and a call admission control method for controlling the admission of a call in a packet communication system in mobile communications.

2. Description of the Related Art

A mobile telephone communication system performs a communication using finite resources (frequencies and power), and the upper limit is applied to the communication capacity. Therefore, it is necessary to limit the number of mobile terminals in a cell depending on the communication capacity. Practically, when a new mobile station starts communications in the cell, it is necessary to judge whether or not the new mobile station can start a communication in the cell. The control is referred to as call admission control. The status in which a new mobile station cannot start a communication in the cell, that is, the status in which the communication capacity is being used substantially 100%, is referred to as a capacity limit.

The conventional method call admission control is a control method of, for example, allowing a new mobile station to start communications when the total number of mobile stations being communicating in the cell does not exceed a predetermined threshold value, and not allowing a new mobile station to start communications when the total number of mobile stations being communicating in the cell exceeds the predetermined threshold value.

Relating to the standardization of a third generation mobile communication system, what is called IMT-2000, the standard specifications related to the W-CDMA system and the CDMA 2000 system are prescribed respectively for the 3GPP (third-generation partnership project) and 3GPP2 (third-generation partnership project 2).

In the 3GPP, with the recent fast spread of the Internet, based on the prediction that high speed and large capacitance traffic by the download, etc. from a database and a Web site especially in the downlink, the specification of the "HSDPA (High Speed Downlink Packet Access)" as a high speed packet transmission system in the downlink direction is prescribed (for example, refer to 3GPP TR25.848v4.0.0).

As for the 3GPP2, from a similar point of view, the specification of the "1x–EVDO" as a high speed dedicated transmission system in the downlink direction is prescribed (for example, refer to 3GPP2 C.S0024Rev.1.0.0). In the CDMA 2000 1xEV-DO, the DO means "Data Only".

Described below is the priority classes in the above-mentioned HSDPA.

In the HSDPA, it is possible to set a plurality of priority classes to transmit packet data having various QoS (Quality of Service). For example, there can be a method of transmitting a packet by setting the packet data of a mobile station for performing VoIP as a first priority class, setting the packet of a mobile station for performing download by an FTP (File Transfer Protocol) as a second priority class, and transmitting the packet data of a mobile station for performing VoIP of high QoS in time on a priority basis. Otherwise, there can be a method of transmitting a packet by setting the packet data of a mobile station in a contract of a high class as the type of contract as a first priority class, setting the packet data of a mobile station in a contract of a low class as the type of contract as a second priority class, and transmitting all packet data of mobile stations in a contract of a high class and then transmitting the packet data of a mobile station in a contract of a low class.

JP2004-328157A (hereinafter refer to as the patent document 1) describes the technique of possibly allocating a call depending on the priority and enhancing the use efficiency of shared resources by determining the influence of a call of a low priority on a system when the call of the low priority is detected in the call admission control device for allocating necessary resources among the shared resources to communications of a plurality of calls of different priorities, and determining the admission of the call of a low priority based on the determination result. JP2002-223239A (hereinafter refer to as the patent document 2) describes the technique of regulating the admission of a new call depending on the type of service or the priority.

SUMMARY OF THE INVENTION

As described above, a method of controlling the admission of a call in a communication system which transmits a packet to a plurality of mobile stations can be a method of not admitting a call by a new mobile station when a total number of mobile stations performing communications in a corresponding cell exceeds a predetermined threshold value.

However, in the conventional call admission control method, a mobile communication system including in a mixed manner mobile stations having the above-mentioned different priority classes cannot perform call admission control with the different priority classes taken into account.

For example, assume that there are three persons having the first priority class in the corresponding cell, and 48 persons having the second priority class when the threshold value is 50. At this time, in the case of the call admission control in the conventional method, a mobile station which is newly starting communications in the cell cannot perform communications in the cell regardless of the first priority class or the second priority class.

However, since the mobile station of the first priority class is higher in priority than a mobile station of the second priority class, it is considered that the new terminal can admit communications in the cell if the new mobile station belongs to the first priority class.

Otherwise, as described above, when there are mobile stations in contract of a high class as a contract type and mobile stations in contract of a low class as a contract type in a mixed manner, the transmission data rate in the capacity limit of a mobile station in a contract of a high class as a contract type normally requires about 64 kbps while the transmission data rate in a capacity limit of a mobile station in contract of a low class as a contract type can be 0 kbps without a problem. In this case, there can be a method in which the number of mobile stations in contract of a high class as a contract type is restricted by a predetermined value, and the number of mobile stations in contract of a low class as a contract type is not restricted. However, it is difficult to perform the call admission control in the above-mentioned conventional technology, or the technology described in the Patent Document 1 and the Patent Document 2.

The present invention has been developed to solve the above-mentioned problems with the conventional technology, and aims at providing a call admission control device and a call admission control method capable of realizing call admission control with the priority class taken into account by performing call admission judgment based on the value obtained by adding the number of mobile stations of each priority class with a weight. In addition, the present invention also aims at providing the call admission control device and the call admission control method capable of realizing call admission control with the priority class taken in account by performing call admission judgment based on the number of mobile stations in the priority class for each priority class.

The call admission control device according to claim 1 of the present invention is a call admission control device in a communication system which transmits a packet to a plurality of mobile stations classified into a plurality of priority classes, and comprises:

mobile station number calculation means for calculating a number of mobile stations which belong to a priority class to which a new mobile station belongs when the new mobile station is starting communications (for example, corresponding to the mobile station number acquisition unit 120 shown in FIG. 4); and new mobile station admission means for controlling admission of a call by the new mobile station based on the number of mobile stations which belong to the priority class to which the new mobile station belongs (for example, corresponding to the first call number judgment unit 160 shown in FIG. 4). Thus, the call admission control can be appropriately performed.

The call admission control device according to claim 2 is based on claim 1, and the new mobile station admission means controls communications of the new mobile station to be admitted depending on a comparison result between the number of mobile stations which belong to the priority class to which the new mobile station belongs and a predetermined threshold value. For example, call admission control can be appropriately performed by admitting communications of the new mobile station when the number of mobile stations which belong to the priority class to which a new mobile station belongs is less than a predetermined threshold value, and not admitting the communications of the new mobile station when the number of mobile stations which belong to the priority class to which a new mobile station belongs is equal to or higher than a predetermined threshold value.

The call admission control device according to claim 3 of the present invention is a call admission control device in a communication system which transmits a packet to a plurality of mobile stations classified into a plurality of priority classes, and comprises:

priority class mobile station number calculation means for calculating the number of mobile stations which belong to the plurality of priority classes for each priority class when the new mobile station is starting communications (for example, corresponding to the mobile station number acquisition unit 120 shown in FIG. 4);

weight coefficient setting means for setting a weight coefficient for each of the plurality of priority classes (for example, corresponding to the weight coefficient setting unit 150 shown in FIG. 4);

threshold value setting means for setting a threshold value for each of the plurality of priority classes (for example, corresponding to the second threshold value setting unit 140 shown in FIG. 4); and new mobile station admission means for controlling admission of a call by the new mobile station based on the number of mobile stations which belong to the plurality of priority classes, the weight coefficient for each of the plurality of priority classes, and the threshold value for each of the plurality of priority classes (for example, corresponding to the second call number judgment unit 170 shown in FIG. 4). Thus, the call admission control can be appropriately performed based on the set threshold value and weight coefficient.

The call admission control device according to claim 4 is a call admission control device in a communication system which transmits a packet to a plurality of mobile stations classified into a plurality of priority classes m (m is a subscript for a priority class, which holds true in the descriptions below), and comprises:

priority class mobile station number calculation means for calculating for each priority class m the number $\text{Num}_m$ of the mobile stations which belong to the plurality of priority classes m when a new mobile station whose priority class is $m_{new}$ is starting communications (for example, corresponding to the mobile station number acquisition unit 120 shown in FIG. 4);

threshold value setting means for setting a threshold value $\text{Th}_m$ for each of the plurality of priority classes m (for example, the second threshold value setting unit 140 shown in FIG. 4);

weight coefficient setting means for setting a weight coefficient $\text{Weight}_m$ for each of the plurality of priority classes m (for example, corresponding to the weight coefficient setting unit 150 in FIG. 4); and new mobile station admission means for admitting communications of the new mobile station only when $\Sigma(\text{Num}_m \times \text{Weight}_m)+\text{Weight}_{m\_new} \leq \text{Th}_{m\_new}$ (new is a subscript for m, $\Sigma$ is a total of all values of m, which holds true in the descriptions below) is true (for example, corresponding to the second call number judgment unit 170). By performing judgment based on the value obtained by adding the number of communicating mobile stations in each priority class with a weight, appropriate call admission control can be performed on various priority classes.

The call admission control device according to claim 5 is a call admission control device in a communication system which transmits a packet to a plurality of mobile stations classified into a plurality of priority classes m (m is a subscript for a priority class), and comprises:

priority class mobile station number calculation means for calculating a number $\text{Num}_m$ of mobile stations which belong to the plurality of priority classes m for each priority class m when a new mobile station whose priority class is $m_{new}$ is starting communications (for example, corresponding to the mobile station number acquisition unit 120 shown in FIG. 4);

first threshold value setting means for setting a first threshold value $\text{Th}_m^{(1)}$ for each of the plurality of priority classes m (for example, corresponding to the first threshold value setting unit 130 shown in FIG. 4);

second threshold value setting means for setting a second threshold value $\text{Th}_m^{(2)}$ for each of the plurality of priority classes m (for example, corresponding to the second threshold value setting unit 140 shown in FIG. 4);

weight coefficient setting means for setting a weight coefficient $\text{Weight}_m$ for each of the plurality of priority classes m (for example, corresponding to the weight coefficient setting unit 150 shown in FIG. 4); and new mobile station admission means for admitting communications by the new mobile station only when $\text{Num}_{m\_new} < \text{Th}_{m-new}^{(1)}$ (new is a subscript for m) is true and $\Sigma(\text{Num}^m \times \text{Weight}_m)+\text{Weight}_{m\_new} \leq \text{Th}_{m-new}^{(2)}$ (new is a subscript for m, and $\Sigma$ is a total of all values of m, which holds true in the descriptions below) is true (for example, corresponding to the first call number judgment unit 160 and the second call number judgment unit 170 shown in FIG. 4). By performing judgment based on the number of communicating mobile stations for each priority class and performing judgment based on the value obtained by adding the number of communicating mobile stations of each priority class with a weight, call admission control can be appropriately performed on various priority classes.

The call admission control device according to claim 6 is based on any of claims 1 to 5, and the priority class is set depending on at least one of a service type, a contract type, a terminal type, and an user identifier. Thus, call admission control can be appropriately performed.

The call admission control method according to claim 7 is a call admission control method in a communication system which transmits a packet to a plurality of mobile stations classified into a plurality of priority classes m (m is a subscript for a priority class), and comprises:

a step of calculating a number $Num_m$ of mobile stations which belong to the plurality of priority classes m for each priority class m when a new mobile station whose priority class is $m_{new}$ is starting communications (for example, corresponding to step S2 shown in FIG. 7);

a step of setting a first threshold value $Th_m^{(1)}$ for each of the plurality of priority classes m (for example, corresponding to step S3 shown in FIG. 7);

a step of setting a second threshold value $Th_m^{(2)}$ for each of the plurality of priority classes m (for example, corresponding to step S4 shown in FIG. 7);

a step of setting a weight coefficient $Weight_m$ for each of the plurality of priority classes m (for example, corresponding to step S5 shown in FIG. 7); and a step of performing control by admitting communications by the new mobile station when $Num_{m\_new} < Th_{m-new}^{(1)}$ (new is a subscript for m) is true and $\Sigma (Num_m \times Weight_m) + Weight_{m\_new} \leq Th_{m-new}^{(2)}$ (new is a subscript for m, and $\Sigma$ is a total of all values of m, which holds true in the descriptions below) is true, and not admitting communications by the new mobile station when at least one of $Num_{m\_new} < Th_{m-new}^{(1)}$ (new is a subscript for m) and $\Sigma (Num_m \times Weight_m) * Weight_{m\_new} \leq Th_{m-new}^{(2)}$ (new is a subscript for m) is false (for example, corresponding to steps S6 to S9 shown in FIG. 7). By performing judgment based on the number of communicating mobile stations for each priority class and performing judgment based on the value obtained by adding the number of communicating mobile stations of each priority class with a weight, call admission control can be appropriately performed on various priority classes.

As explained above, the present invention has an effect of realizing call admission control with the priority class taken into account by performing call admission control based on the value obtained by adding the number of mobile stations of each priority class with a weight, and the number of mobile station of each priority class.

BRIEF DESCRIPTION OF THE DRAWINGS

FIG. 7 is a flowchart showing the call admission control method in the mode for embodying the present invention.

DETAILED DESCRIPTION OF THE PREFERRED EMBODIMENTS

Figure 1:
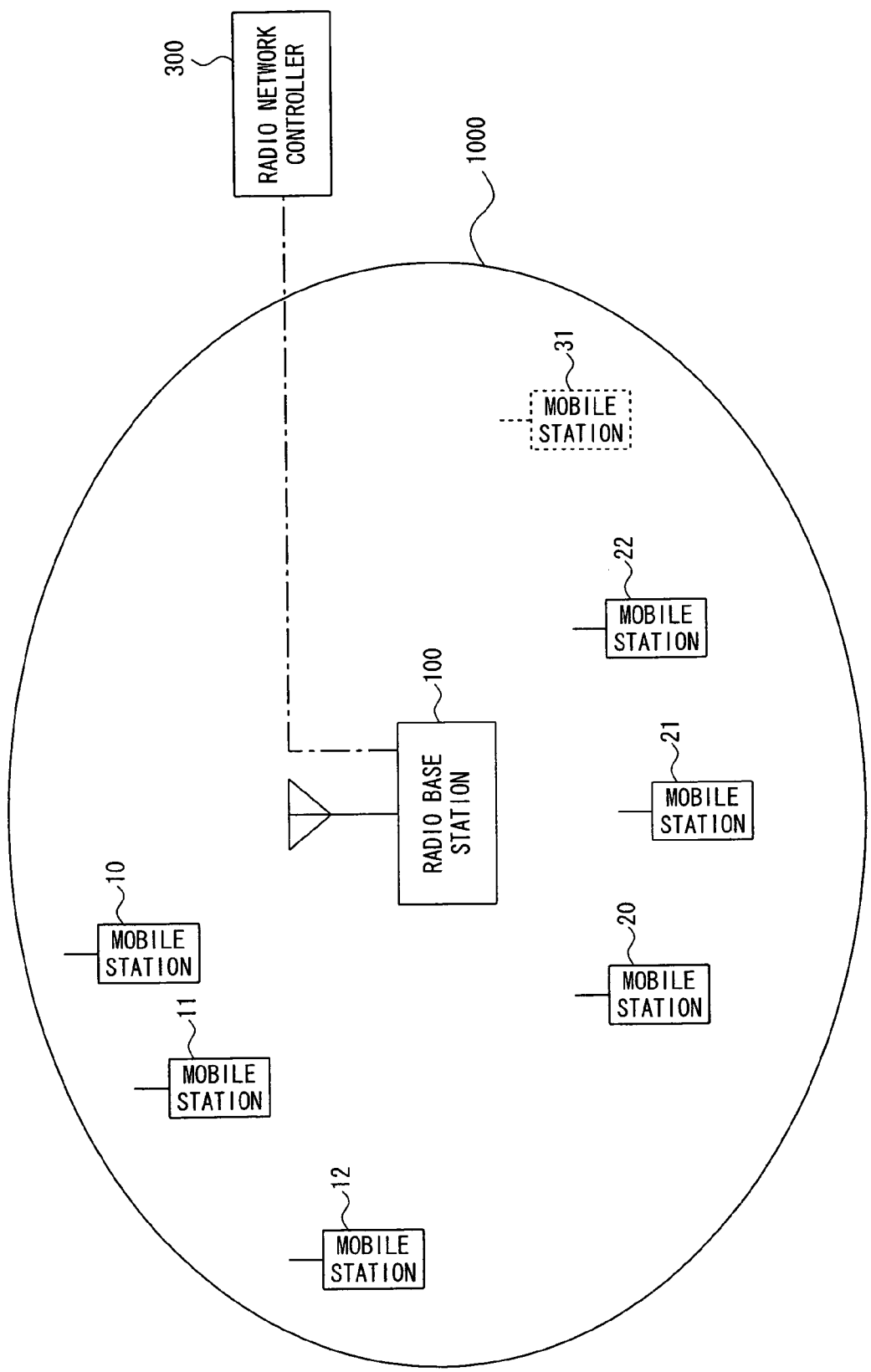
FIG. 1 shows an example of the configuration of the mobile communication system using a call admission control device according to one embodiment of the present invention.

The mode for embodying the present invention is explained below by referring to the attached drawings. In the referenced figures in the explanation below, the same components shown in various figures are identified by the same reference numerals.

Embodiment Mode 1

The mode for embodying the present invention is explained below by referring to the attached drawings.

FIG. 1 shows an example of the configuration of the mobile communication system using the call admission control device according to a mode for embodying the present invention.

In FIG. 1, the mobile communication system is configured by a plurality of mobile stations 10 to 12, 20 to 22, and 31 as mobile stations, a radio base station 100, and a radio network controller 300 for controlling them, and the HSDPA is applied. The radio base station 100 and the radio network controller 300 realize the functions as the call admission control device. A cell 1000 indicates an area in which the radio base station 100 can offer communications.

The mobile stations 10 to 12 are in the state in which communications are already being performed in the cell 1000 using the radio base station 100 and the HSDPA, and belong to the first priority class. The mobile stations 20 to 22 are in the state in which communications are already being performed in the cell 1000 using the radio base station 100 and the HSDPA, and belong to the second priority class. In FIG. 1, the mobile station belonging to the first priority class and a mobile station belonging to the second priority class are described, but there can be three or more priority classes. In the case described below, it is assumed that there are M priority classes in the mobile communication system. The subscript for the priority class is m. The mobile station 31 is in the state in which communications are newly started in the cell 1000 using the radio base station 100 and the HSDPA, and belongs to the $m_{new}$-th priority class.

Additionally, the mobile station 31 is used as an example of a mobile station in a state in which a new communication is to be started using the HSDPA.

A communication channel in the HSDPA is explained below. In the downlink in the HSDPA, a high speed physical downlink shared channel HS-PDSCH shared by each of the mobile stations, or a high speed downlink shared channel HS-DSCH as a transport channel, a high speed shared control channel HS-SCCH shared by each mobile station, and an associated dedicated physical channel A-DPCH associated with the shared physical channel dedicated to each mobile station are used.

In the uplink, in addition to the uplink associated dedicated channel A-DPCH dedicated to each mobile station, a control channel (high speed dedicated physical control channel) for the HSDPA dedicated to each mobile station is used.

In the downlink, along the downlink associated dedicated channel, a transmission power control command, etc. for the uplink associated dedicated channel is transmitted, and user data is transmitted along the shared physical channel. On the other hand, in the uplink, a pilot symbol and a power control command (TPC command) for downlink associated dedicated channel transmission are transmitted in addition to the user data along the uplink associated dedicated channel, and downlink quality information Channel Quality Indicator (CQI) used for the scheduling of a shared channel and the AMCS (Adaptive Modulation/Coding Scheme), and acknowledgement for downlink shared channel HS-DSCH are transmitted along the dedicated control channel for the HSDPA.

Configuration Example of Radio Base Station

Figure 2:
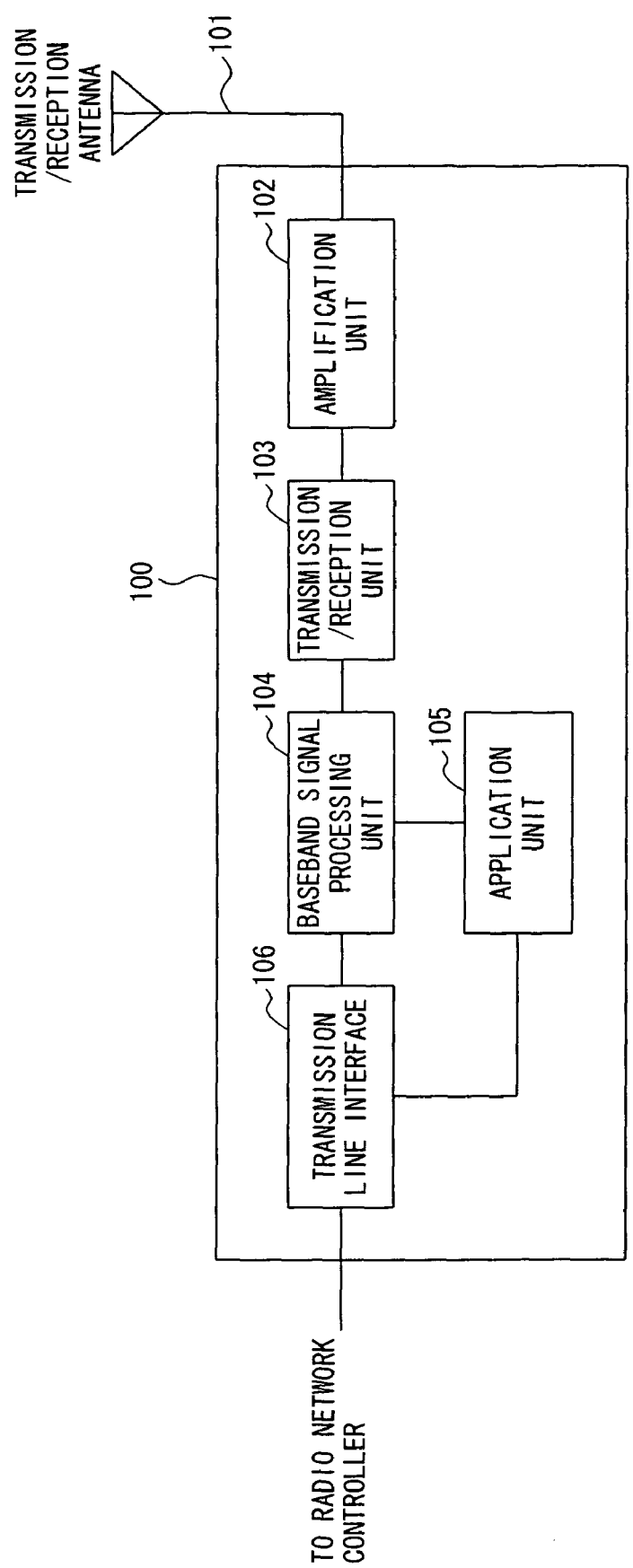
FIG. 2 is a functional block diagram showing an example of the configuration of the radio base station shown in FIG. 1.

FIG. 2 is a block diagram of the function showing an example of the configuration of the radio base station 100 shown in FIG. 1.

In FIG. 2, the radio base station 100 is constituted by a transmission/reception antenna 101, an amplification unit 102, a transmission/reception unit 103, a baseband signal processing unit 104, an application unit 105, and a transmission line interface 106. The downlink packet data is input from the radio network controller 300 positioned in the upper layer of the radio base station 100 to the baseband signal processing unit 104 through the transmission line interface 106. The baseband signal processing unit 104 performs retransmission control (H-ARQ (Hybrid ARQ)) processing, scheduling, transmission format selection, channel coding, and spreading process for the downlink packet data output from the transmission line interface 106, and the result is transferred to the transmission/reception unit 103. The transmission/reception unit 103 performs a frequency converting process of converting a baseband signal output from the baseband signal processing unit 104 into a radio frequency band. Then, the resultant signal is amplified by the amplification unit 102 and transmitted through the transmission/reception antenna 101.

On the other hand, as for the uplink data, the radio frequency signal received by the transmission/reception antenna 101 is amplified by the amplification unit 102, and the transmission/reception unit 103 frequency-converts it into a baseband signal. The baseband signal is processed by the baseband signal processing unit 104 for de-spreading, RAKE combining, and error correction decoding, and then transferred to the radio network controller through the transmission line interface 106.

Configuration Example of Baseband Signal Processing Unit and Application Unit

Figure 3:
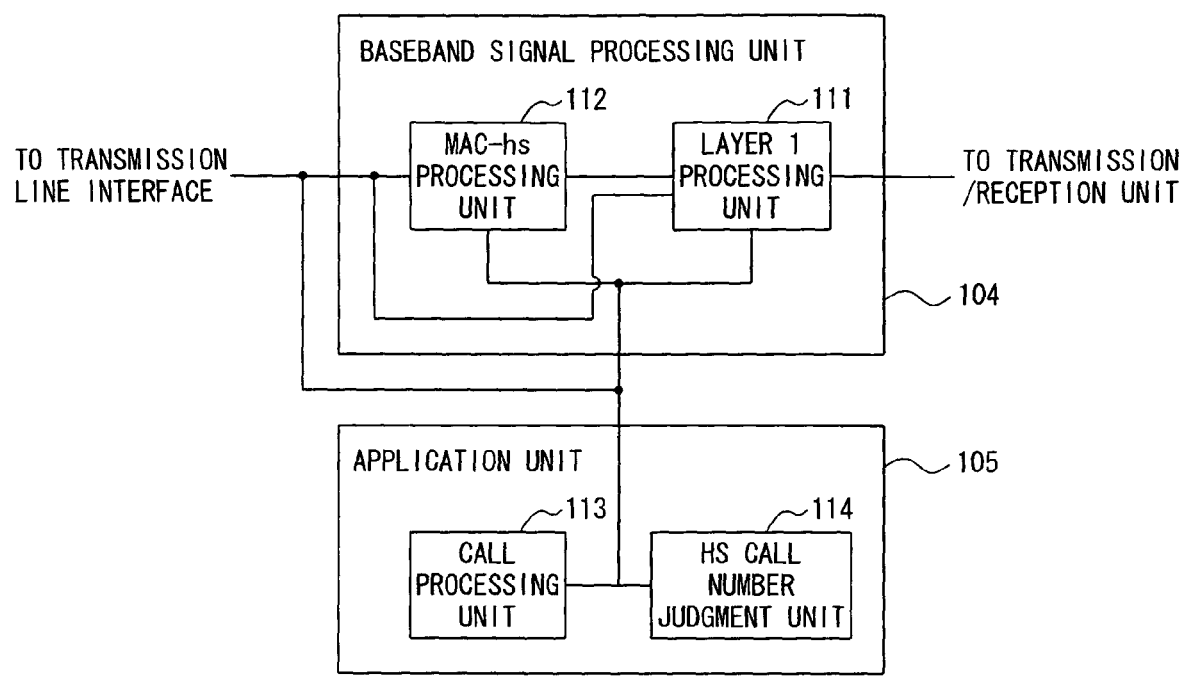
FIG. 3 is a block diagram showing an example of the configuration of the function of the baseband signal processing unit and an application unit shown in FIG. 2.

FIG. 3 is a block diagram showing an example of the function configuration of the baseband signal processing unit 104 and the application unit 105 shown in FIG. 2. In FIG. 3, the baseband signal processing unit 104 is configured by a layer 1 processing unit 111 and a MAC-hs (short for Medium Access Control-HSDPA) processing unit 112. The application unit 105 is constituted by a call processing unit 113 and an HS call number judgment unit 114. The layer 1 processing unit 111 and the MAC-hs processing unit 112 in the baseband signal processing unit 104 are respectively connected to the call processing unit 113 and the HS call number judgment unit 114 in the application unit 105.

In the layer 1 processing unit 111, the processes including downlink data channel coding, uplink data channel decoding, transmission power control of uplink and downlink dedicated channels, RAKE combining, spreading/de-spreading processing are performed. In the MAC-hs processing unit 112, the processes including the HARQ of downlink shared channel in the HSDPA, scheduling of a packet in waiting for transmission, determination of a transmission format in the downlink shared channel, etc. are performed.

In the call processing unit 113, a call processing control signal is transmitted and received to and from the radio network controller, and status management and allocation of resources are performed. The HS call number judgment unit 114 performs call admission judgment as to whether or not the mobile station 31 can newly start communications using the HSDPA in the cell 1000 based on the number of mobile stations which are performing communications using the HSDPA in the cell 1000. The number of mobile stations which are performing communications using the HSDPA in the cell 1000 is calculated with the priority class taken into account as described later.

Example of Configuration of HS Call Number Judgment Unit

Figure 4:
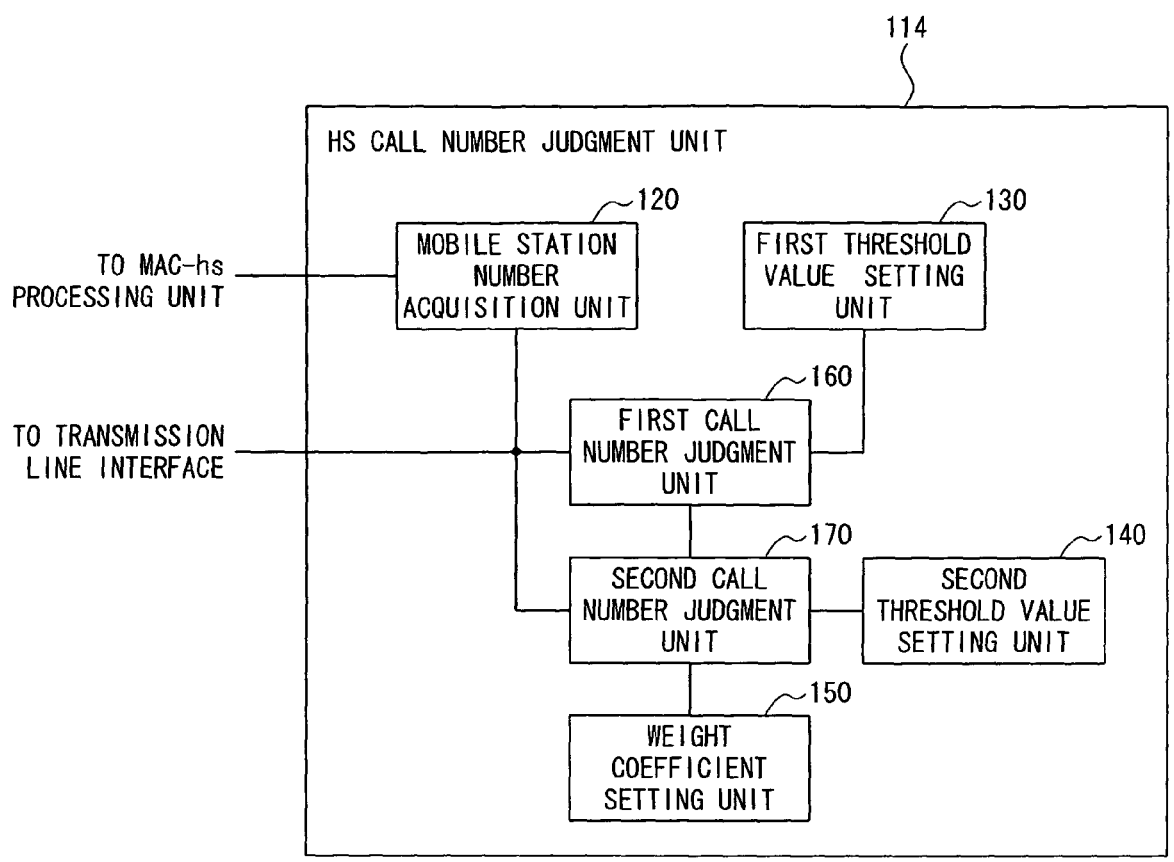
FIG. 4 is a block diagram showing an example of the configuration of the function of the HS call number judgment unit shown in FIG. 3.

FIG. 4 shows an example of the configuration of the function of the HS call number judgment unit 114 shown in FIG. 3. In FIG. 4, the HS call number judgment unit 114 is configured by, for example, the following function blocks.
(1) mobile station number acquisition unit 120
(2) first threshold value setting unit 130
(3) second threshold value setting unit 140
(4) weight coefficient setting unit 150
(5) first call number judgment unit 160
(6) second call number judgment unit 170

The mobile station number acquisition unit 120 of (1) above acquires from the MAC-hs processing unit 112 the number $Num_m$ of mobile stations performing communications using the HSDPA in the cell 1000 for each priority class, and notifies the first call number judgment unit 160 and the second call number judgment unit 170 of the number $Num_m$ of mobile stations performing communications using the HSDPA in the cell 1000 for each priority class. The number $Num_m$ of mobile stations performing communications using the HSDPA in the cell 1000 for each priority class can be a momentary value or an average value in a predetermined averaging region.

In the practical communications, although the communications using the HSDPA are being performed, there can be a time period in which there is no data in the data queue. For example, when a mobile station is performing the FTP download, there is data in the data queue of the mobile station all the time. However, when i-mode (registered trademark), Web-browsing, etc. are performed, data is generated at random, there is a time period when there is no data in the data queue of the mobile station. Therefore, the mobile station number acquisition unit 120 can acquire the number of mobile stations which perform the communications using the HSDPA in the cell 1000 and have data in the data queue instead of the number of mobile stations performing communications using the HSDPA in the cell 1000 for each priority class. Also in this case, the number of mobile stations can be a momentary value or an average value in a predetermined averaging region.

The first threshold value setting unit 130 of (2) above sets a first threshold value $Th_m^{(1)}$ of the m-th priority class, and notifies the first call number judgment unit 160 of the first threshold value $Th_m^{(1)}$ of the m-th priority class.

For example, a high first threshold value of a high priority class can be set, and a low first threshold value of a low priority class can be set. Inversely, a low first threshold value of a high priority class can be set, and a high first threshold value of a low priority class can be set.

The second threshold value setting unit 140 of (3) above sets a second threshold value $\text{Th}_m^{(2)}$ of the m-th priority class, and notifies the second call number judgment unit 170 of the threshold value.

For example, a high second threshold value of a high priority class can be set, and a low second threshold value of a low priority class can be set. Inversely, a low second threshold value of a high priority class can be set, and a high second threshold value of a low priority class can be set.

The weight coefficient setting unit 150 of (4) above sets a weight coefficient $\text{Weight}_m$ of the m-th priority class, and notifies the second call number judgment unit 170 of the weight coefficient $\text{Weight}_m$ of the m-th priority class.

For example, a high weight coefficient of a high priority class can be set, and a low weight coefficient of a low priority class can be set. Inversely, a low weight coefficient of a high priority class can be set, and a high second threshold value of the weight coefficient of a low priority class can be set.

The first call number judgment unit 160 of (5) above receives from the mobile station number acquisition unit 120 the number $\text{Num}_m$ of mobile stations performing communications using the HSDPA in the cell 1000 for each priority class, and receives from the first threshold value setting unit 130 the first threshold value $\text{Th}_m^{(1)}$ of the m-th priority class. The first threshold value setting unit 160 judges whether or not the mobile station 31 can newly start communications using the HSDPA in the cell 1000 based on the number $\text{Num}_m$ of mobile stations performing communications using the HSDPA in the cell 1000 and the first threshold value $\text{Th}_m^{(1)}$ of the m-th priority class for each priority class, and notifies the radio network controller 300 through the transmission line interface 106 of the judgment result.

For example, the first call number judgment unit 160 can judge that the mobile station 31 can newly start the communications using the HSDPA in the cell 1000 when the following equation (1) is true, and can judge that the mobile station 31 cannot newly start the communications using the HSDPA in the cell 1000 when the following equation (1) is false.

$$\text{Num}_{m\_new} < \text{Th}_{m\text{-}new}^{(1)} \tag{1}$$

where "new" is a subscript for "m".

The second call number judgment unit 170 of (6) above receives from the mobile station number acquisition unit 120 the number $\text{Num}_m$ of mobile stations performing communications using the HSDPA in the cell 1000 for each priority class, receives from the second threshold value setting unit 140 a second threshold value $\text{Th}_m^{(2)}$ of the m-th priority class, and receives from the weight coefficient setting unit 150 a weight coefficient $\text{Weight}_m$ of the m-th priority class. The second call number judgment unit 170 judges whether or not the mobile station 31 can newly start the communications using the HSDPA in the cell 1000 based on the number $\text{Num}_m$ of mobile stations performing communications using the HSDPA in the cell 1000, the second threshold value $\text{Th}_m^{(2)}$ of the m-th priority class, and the weight coefficient $\text{Weight}_m$ of the m-th priority class for each priority class, and notifies the radio network controller 300 through the transmission line interface 106 of the judgment result.

For example, the second call number judgment unit 170 can judge that the mobile station 31 can newly start the communications using the HSDPA in the cell 1000 when the following equation (2) is true, and can judge that the mobile station 31 cannot newly start the communications using the HSDPA in the cell 1000 when the following equation (2) is false.

$$\Sigma(\text{Num}_m \times \text{Weight}_m) + \text{Weight}_{m\_new} \leq \text{Th}_{m\text{-}new}^{(2)} \tag{2}$$

where "new" is a subscript for "m".

In the example above, the first threshold value $\text{Th}_m^{(1)}$ of the m-th priority class is a fixed value, but the value can be adaptively controlled depending on the transmission power that can be allocated to the HS-PDSCH. For example, $\text{Th}_m^{(1)}$, 50% can be set by assuming that the transmission power that can be allocated to the HS-PDSCH is 50% of the maximum transmission power of the radio base station 100, and when the transmission power that can be practically allocated to the HS-PDSCH is 40%, the above-mentioned process can be performed by the following equation.

first threshold value $\text{Th}_m^{(1)}$ of the m-th priority class $$=(40\%/50\%) \times \text{Th}_m^{(1)}, 50\%$$

The similar control can be performed on the second threshold value of the m-th priority class. That is, without setting the second threshold value $\text{Th}_m^{(2)}$ of the m-th priority class as a fixed value, the threshold value can be adaptively controlled depending on the transmission power that can be allocated to the HS-PDSCH. For example, $\text{Th}_m^{(2)}$, 50% can be set by assuming that the transmission power that can be allocated to the HS-PDSCH is 50% of the maximum transmission power of the radio base station 100, and when the transmission power that can be practically allocated to the HS-PDSCH is 40%, the above-mentioned process can be performed by the following equation.

second threshold value $\text{Th}_m^{(2)}$ of the m-th priority class $$=(40\%/50\%) \times \text{Th}_m^{(2)}, 50\%$$

Example of Setting the Second Threshold Value and a Weight Coefficient

Figures 5, 6:
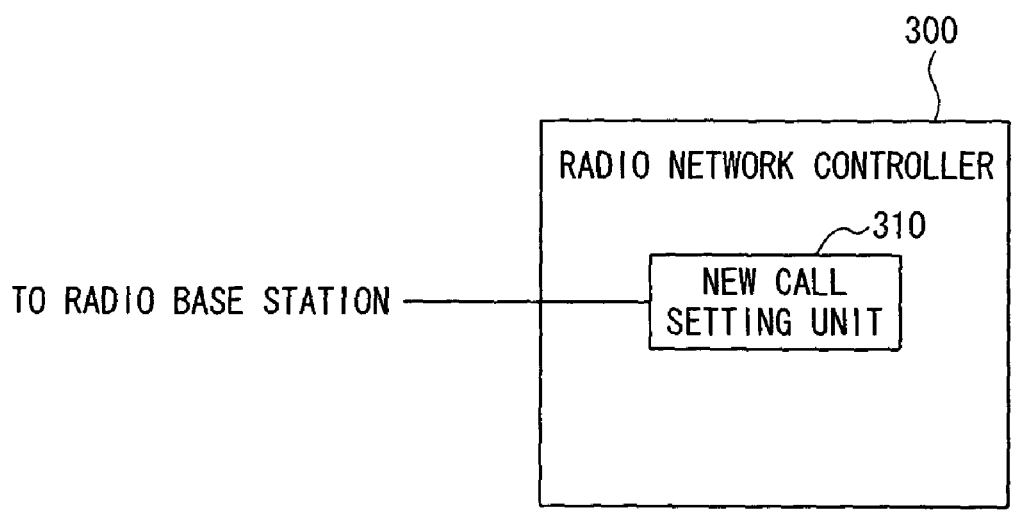
FIG. 5 shows an example setting the second threshold value and the weight coefficient.
FIG. 6 is a block diagram showing an example of the configuration of the function of the radio network controller shown in FIG. 1.

Described below is a setting example of a combination of the second threshold value $\text{Th}_m^{(2)}$ of the m-th priority class and weight coefficient $\text{Weight}_m$ of the m-th priority class. FIG. 5 shows an example setting the second threshold value and the weight coefficient.

Relating to the first priority class, it is considered that a high transmission data rate is to be maintained. Although there are no mobile stations of the second and third priority classes, it is indented to limit the number of mobile stations to 10, the weight coefficient $\text{Weight}_m$ is set to 10, and the second threshold value $\text{Th}_m^{(2)}$ is set to 100. When there are mobile stations of the second and third priority classes, the number of mobile stations of the first priority class capable of performing communications in the cell 1000 is limited based on the number of mobile stations and the weight coefficient. For example, when there are two mobile stations of the second priority class and nine mobile stations of the third priority class, the maximum number of mobile stations of the first priority class is 8. The weight coefficients of the first and second priority classes are low because the scheduling process in the MAC-hs processing unit 112 is performed based on the priority depending on the weight coefficient.

Relating to the second priority class, it is considered that a certain transmission data rate is to be realized although the high transmission data rate of the first priority class is not necessary, the weight coefficient $\text{Weight}_m$ is set to 5, and the second threshold value $\text{Th}_m^{(2)}$ is set to 300. In this case, when there are no mobile stations of the first and third priority classes, the maximum number of mobile stations of the second priority class is 60.

Relating to the third priority class, the transmission data rate of 0 kbps is allowed, it is considered that the largest possible number of mobile stations are admitted in the cell 1000, the weight coefficient $\text{Weight}_m$ is set to 0, and the second threshold value $\text{Th}_m^{(2)}$ is set to 1000.

The above-mentioned plural priority classes can be set depending on the service type, contract type, terminal type, and user identifier. For example, the service type indicates the type of service of transmitting a downlink packet, and includes, for example, a VoIP service, a voice service, a streaming service, an FTP service, etc. The contract type indicates the type of contract made by an user of a destination mobile station of a downlink packet, and includes, for example, a low class contract, a high class contract, etc. The terminal type indicates a classified function of a mobile station as a destination of a downlink packet, and includes, for example, a class according to the identification information about a mobile station, presence/absence and type of RAKE receiving function, an equalizer, a receive diversity, an interference canceller, etc., a receivable modulation scheme, the terminal capability such as the number of codes, the number of bits, etc. For example, in the specification of the 3GPP, the HS-DSCH category is defined as a category class of an HSDPA mobile station (refer to TS25.306 v5.12.0). An user identifier indicates, for example, the identification information about a mobile station and an identifier based on an user contract ID.

Example of the Configuration of a Radio Network Controller

FIG. 6 is a block diagram showing an example of the configuration of the function of the radio network controller 300. In FIG. 6, only the portion of setting a new call is described in the functions of the radio network controller 300, and other functions are omitted. The radio network controller 300 is provided with a new call setting unit 310.

The new call setting unit 310 receives from the first call number judgment unit 160 and the second call number judgment unit 170 in the radio base station 100 a judgment result as to whether or not the mobile station 31 can newly start communications using the HSDPA in the cell 1000. When both first call number judgment unit 160 and second call number judgment unit 170 return the judgment result that the mobile station 31 can newly start communications using the HSDPA in the cell 1000, the new call setting unit 310 performs the process for the mobile station 31 starting communications using the HSDPA in the cell 1000. That is, the new call setting unit 310 notifies the radio base station 100 and the mobile station 31 of a control signal for starting communications, and sets the communications.

On the other hand, at least one of the judge results from the call number judge unit 160 and the second call number judge unit 170 is such that when the judgment result indicates that the mobile station 31 cannot newly start communications using the HSDPA in the cell 1000, the new call setting unit 310 does not perform the process for the mobile station 31 starting communications using the HSDPA in the cell 1000. In this case, for example, the new call setting unit 310 can perform the process for starting communications using a dedicated channel instead of the process for starting communications using the HSDPA. In this case, the mobile station 31 performs communications using a dedicated channel in the cell 1000. Otherwise, the new call setting unit 310 can notify the mobile station 31 of the information that the communications using the HSDPA cannot be performed instead of performing the process for starting communications using the HSDPA. In this case, the communications to be started by the mobile station 31 refer to lost calls.

Although the HS call number judge unit 114 in the radio base station 100 judges whether or not the communications using the HSDPA can be started, and the new call setting unit 310 in the radio network controller 300 actually perform call admission control as to whether or not the communications using the HSDPA are set, the present invention is not limited to this mode for embodying the present invention. That is, the radio base station 100 can judge whether or not the communications using the HSDPA can be started and set the communications using the HSDPA, and the radio network controller 300 can judge whether or not the communications using the HSDPA can be started and set the communications using the HSDPA.

In the above-mentioned example, the call admission control is performed as to whether or not the communications of the HSDPA are practically set based on both of the judgment result of the first call number judgment unit 160 and the judgment result of the second call number judgment unit 170. Alternatively, it is also possible to perform the control based on only the judgment result of the first call number judgment unit 160, or only the judgment result of the second call number judgment unit 170.

Furthermore, in the above-mentioned example, when both judgment results of the first call number judgment unit 160 and the second call number judgment unit 170 state that the mobile station 31 can newly start communications using the HSDPA in the cell 1000, the process for the mobile station 31 starting communications using the HSDPA in the cell 1000 is performed. However, it is also possible to perform the process for the mobile station 31 starting the communications using the HSDPA in the cell 1000 when at least one of the judgment results from the first call number judgment unit 160 and the second call number judgment unit 170 states that the mobile station 31 can newly start the communications using the HSDPA in the cell 1000.

(Call Admission Control Method)

The call admission control method in the mode for embodying the present invention is explained below by referring to the flowchart shown in FIG. 7. The control method is realized by the HS call number judgment unit 114, the new call setting unit 310, etc.

In FIG. 7, first in step S1, the HS call number judgment unit 114 acquires the information that the mobile station 31 is newly starting communications using the HSDPA in the cell 1000.

In step S2, the mobile station number acquisition unit 120 acquires the number of mobile stations for each priority class. That is, it sets the number $Num_m$ of mobile stations of the m-th priority class (m: 0, 1, 2, ..., M).

In step S3, the first threshold value setting unit 130 sets the first threshold value for each priority class. That is, it sets the first threshold value $Th_m^{(1)}$ of the m-th priority class (m: 0, 1, 2, ..., M).

In step S4, the second threshold value setting unit 140 sets the second threshold value for each priority class. That is, it sets the second threshold value $Th_m^{(2)}$ of the m-th priority class (m: 0, 1, 2, ..., M).

In step S5, the weight coefficient setting unit 150 sets a whether or not for each priority class. That is, it sets a weight coefficient $Weight_m$ of the m-th priority class (m: 0, 1, 2, ..., M).

In step S6, the first call number judgment unit 160 judges whether or not $Num_{m\_new} < Th_{m\text{-}new}^{(1)}$ ("new" is a subscript for "m") is true. If it is judged that $Num_{m\_new} < Th_{m\text{-}new}^{(1)}$ ("new" is a subscript for "m") is true, control is passed to step S7. If it is judged that $Num_{m\_new} < Th_{m\text{-}new}^{(1)}$ ("new" is a subscript for "m") is false, control is passed to step S9.

In step S7, the second call number judgment unit 170 judges whether or not the following expression is true.

$$\Sigma(\text{Num}_m \times \text{Weight}_m) + \text{Weight}_{m\_new} \leq \text{Th}_m^{(2)} \text{ ("new" is a subscript for "}m\text{")}$$

If it is judged that the following expression is true, control is passed to step S8.

$$\Sigma(\text{Num}_m \times \text{Weight}_m) + \text{Weight}_{m\_new} \leq \text{Th}_m^{(2)} \text{ ("new" is a subscript for "}m\text{")}$$

If it is judged that the following expression is false, control is passed to step S9.

$$\Sigma(\text{Num}_m \times \text{Weight}_m) + \text{Weight}_{m\_new} \leq \text{Th}_m^{(2)} \text{ ("new" is a subscript for "}m\text{")}$$

In step S8, the new call setting unit 310 judges that the mobile station 31 can newly start communications using the HSDPA in the cell 1000, and sets the communications for the mobile station 31 newly performing the communications using the HSDPA in the cell 1000.

In step S9, the new call setting unit 310 judges that the mobile station 31 cannot newly start communications using the HSDPA in the cell 1000, and sets the communications for the mobile station 31 newly performing the communications using a dedicated channel in the cell 1000. The new call setting unit 310 judges that the mobile station 31 cannot newly start communications using the HSDPA in the cell 1000 instead of performing settings so that the mobile station 31 can newly start communications using a dedicated channel in the cell 1000, and can perform the process of not performing settings of any communications. In this case, the communications to be performed by the mobile station 31 refer to lost calls.

In the description above, the processes in steps S2 to S5 are performed with the timing of the mobile station 31 newly starting the communications using individual channels in the cell 1000, but the processes in steps S2 to S5 can also be performed at predetermined time intervals. For example, assuming 3 seconds as a judging period, the processes in steps S2 to S5 can be performed every 3 seconds. In this case, the processes in steps S2 to S5 are performed in the background, and the process result in steps S2 to S5 is referred to when the processes in step S6 to S9 are performed.

Described below are, in steps S6 and S7, the effects of the operations of judging whether or not the following expressions are true.

$$\text{Num}_{m\_new} < \text{Th}_{m\text{-}new}^{(1)} \text{ (("new" is a subscript for "}m\text{")}$$

and $$\Sigma(\text{Num}_m \times \text{Weight}_m) + \text{Weight}_{m\_new} \leq \text{Th}_m^{(2)} \text{ ("new" is a subscript for "}m\text{")}$$

By making judgment based on the number of mobile stations during communications for each priority class, and making judgment based on a value obtained by adding the number of mobile stations during communications of each priority class with a weight, the call admission control can be appropriately performed on various priority classes.

Variation Example

The settings can be made based on the above-mentioned first threshold value $\text{Th}_m^{(1)}$ of the m-th priority class, second threshold value $\text{Th}_m^{(2)}$ of the m-th priority class, weight coefficient $\text{Weight}_m$ of the m-th priority class, and a specification of a remote unit through the transmission line interface 106, for example, an upper node of the radio base station 100 (for example, a radio network controller, a server on a core network, etc.). Otherwise, the above-mentioned first threshold value $\text{Th}_m^{(1)}$ of the m-th priority class, second threshold value $\text{Th}_m^{(2)}$ of the m-th priority class, and weight coefficient $\text{Weight}_m$ of the m-th priority class can be held as internal data of the radio base station 100, and the value in the internal data can be referred to for the settings.

In the above-mentioned mode for embodying the present invention, when there are a plurality of priority classes, the call admission control can be performed with the priority class taken into account.

The HS call number judgment unit 114 is constituted by a programmable device capable of rewriting a program, for example, a CPU, a digital signal processor (DSP), an FPGA (Field Programmable Gate Array), etc. The program of the above-mentioned processes is stored in a predetermined memory area, and parameters ($\text{Th}_m^{(1)}$, $\text{Th}_m^{(2)}$, and $\text{Weight}_m$) are downloaded and rewrote. At this time, the parameters ($\text{Th}_m^{(1)}$, $\text{Th}_m^{(2)}$, and $\text{Weight}_m$) can be downloaded from an upper node of the radio base station, or a terminal I/F (external interface function) can be provided for the HS call number judgment unit 114 so that the parameters ($\text{Th}_m^{(1)}$, $\text{Th}_m^{(2)}$, and $\text{Weight}_m$) can be read from the terminal.

The priority class used in the above-mentioned example is referred to as a "priority class" in the specification of the 3GPP.

Each function block of the HS call number judgment unit 114 can be divided by hardware, or divided as software by a program in a processor.

The above-mentioned embodiment is described relating to the high speed packet transmission system HSDPA in the 3GPP, but the present invention is not limited to the above-mentioned HSDPA, and it can be applied to a high speed packet transmission system in another mobile communication system. For example, the high speed packet transmission system provided by the long term evolution of the 3GPP, the cdma2000 1×EV DV in the 3GPP2, and the high speed packet transmission system in the TDD system, etc. can be used as other high speed packet transmission systems. In the above-mentioned example, it is applied to the high speed packet transmission system in the downlink, but the present invention can be applied to the high speed packet transmission system in the uplink. There is, for example, HSUPA, as the packet transmission system in the uplink in the 3GPP.

The present invention can be applied to the call admission control of packet communications in the mobile communications system.

What is claimed is:

1. A call admission control device in a communication system which transmits a packet to a plurality of mobile stations classified into a plurality of priority classes m, where m is a subscript for a priority class, the call admission control device comprising:

priority class mobile station number calculation means for calculating, when a new mobile station having a priority class $m_{new}$ is starting communication in a cell, a number $\text{Num}_m$ of mobile stations for each of the plurality of priority classes m, the mobile stations having the plurality of priority classes and performing communication in the cell;

first threshold value setting means for setting a first threshold value $\text{Th}_m^{(1)}$, which is a positive integer and which is any one of a fixed value and a value adaptively controlled depending on a transmission power allocatable to a downlink, for each of the plurality of priority classes m;

second threshold value setting means for setting a second threshold value $\text{Th}_m^{(2)}$, which is a positive integer and which is any one of a fixed value and a value adaptively controlled depending on the transmission power allocatable to the downlink, for each of the plurality of priority classes m;

weight coefficient setting means for setting a weight coefficient $Weight_m$ for each of the plurality of priority classes m, so that a high weight coefficient is set for a high priority class and a low weight coefficient is set for a low priority class, or a low weight coefficient is set for the high priority class and a high weight coefficient is set for the low priority class;

a first call number judgment unit that receives the number $Num_m$ of the mobile stations, which belong to the plurality of priority classes m for each priority class m, and which have already started communication from the priority class mobile station number calculation means, and the first threshold value $Th_m^{(1)}$ from the first threshold value setting means, and determines whether or not the communication of the new mobile station is admitted;

a second call number judgment unit that receives the number $Num_m$ of the mobile stations, which belong to the plurality of priority classes m for each priority class m, and which have already started communication from the priority class mobile station number calculation means, the second threshold value $Th_m^{(2)}$ from the second threshold value setting means, and the weight coefficient $Weight_m$ for each of the plurality of priority classes m from the weight coefficient setting means, and determines whether or not the communication of the new mobile station is admitted; and new mobile station admission means for admitting the communication by the new mobile station, only when the first call number judgment unit determines that $Num_{m\_new} < Th_{m-new}^{(1)}$, where new is a subscript for m, is true and the second call number judgment unit determines that $\Sigma(Num_m \times Weight_m) + Weight_{m\_new} \leq Th_{m-new}^{(2)}$ is true, where new is a subscript for m, $\Sigma$ is a total of all values of m, and Weight is a numeric value.

2. The call admission control device according to claim 1, wherein the priority class is set depending on at least one of a service type, a contract type, a terminal type, and an user identifier.

3. A call admission control method in a communication system which transmits a packet to a plurality of mobile stations classified into a plurality of priority classes m, where m is a subscript for a priority class, the call admission control method comprising:

calculating, when a new mobile station having a priority class $m_{new}$ is starting communication in a cell, a number $Num_m$ of mobile stations for each of the plurality of priority classes m, the mobile stations having the plurality of priority classes and performing communication in the cell;

setting a first threshold value $Th_m^{(1)}$, which is a positive integer and which is any one of a fixed value and a value adaptively controlled depending on a transmission power allocatable to a downlink, for each of the plurality of priority classes m;

setting a second threshold value $Th_m^{(2)}$, which is a positive integer and which is any one of a fixed value and a value adaptively controlled depending on the transmission power allocatable to the downlink, for each of the plurality of priority classes m;

setting a weight coefficient $Weight_m$ for each of the plurality of priority classes m, so that a high weight coefficient is set for a high priority class and a low weight coefficient is set for a low priority class, or a low weight coefficient is set for the high priority class and a high weight coefficient is set for the low priority class;

receiving the number $Num_m$ of the mobile stations, which belong to the plurality of priority classes m for each priority class m, and which have already started communication from the calculating, and the first threshold value $Th_m^{(1)}$ from the setting of the first threshold value, and determining whether or not the communication of the new mobile station is admitted;

receiving the number $Num_m$ of the mobile stations, which belong to the plurality of priority classes m for each priority class m, and which have already started communication from the calculating, the second threshold value $Th_m^{(2)}$ from the setting of the second threshold value, and the weight coefficient $Weight_m$ for each of the plurality of priority classes m from the setting of the weight coefficient, and determining whether or not the communication of the new mobile station is admitted; and performing control by admitting the communication by the new mobile station, only when $Num_{m\_new} < Th_{m-new}^{(1)}$ is true and $\Sigma(Num_m \times Weight_m) + Weight_{m\_new} \leq Th_{m-new}^{(2)}$ is true, where new is a subscript for m, is a total of all values of m, and Weight is a numeric value.

* * * * *